INVENTOR.
EDWARD K. DOMBECK
BY
Sheldon Rajee
ATTORNEY

Sept. 17, 1963  E. K. DOMBECK  3,103,992
AUTOMATIC ADJUSTER
Filed Jan. 2, 1962  2 Sheets-Sheet 2

INVENTOR.
EDWARD K. DOMBECK
BY
Sheldon Raizes
ATTORNEY

United States Patent Office 3,103,992
Patented Sept. 17, 1963

3,103,992
AUTOMATIC ADJUSTER
Edward K. Dombeck, South Bend, Ind., assignor to The Bendix Corporation, South Bend, Ind., a corporation of Delaware
Filed Jan. 2, 1962, Ser. No. 163,683
2 Claims. (Cl. 188—79.5)

This invention concerns an automatic brake adjuster for a brake assembly.

An object of this invention is to provide a new, improved and economical automatic adjuster for the brake assembly.

A further object of the invention is to provide a brake assembly with an automatic adjuster, which adjuster comprises a lever engaging a star wheel of a strut and is biased into engagement with the star wheel by a torsion spring mounted at one end on the same brake shoe the lever is mounted and has its other end engaging the lever.

A still further object of the invention is to provide a brake assembly with an automatic adjuster comprising a lever biased into engagement with a star wheel of a strut by a spring holding two opposed ends of the brake shoes in engagement with the strut wherein said spring engages the lever intermediate the ends of the spring.

Further objects and advantages will become apparent to those skilled in the art to which the invention relates from the following description of the preferred embodiment with reference to the accompanying drawings forming a part of this specification, and in which.

Figures 1, 2, 3:
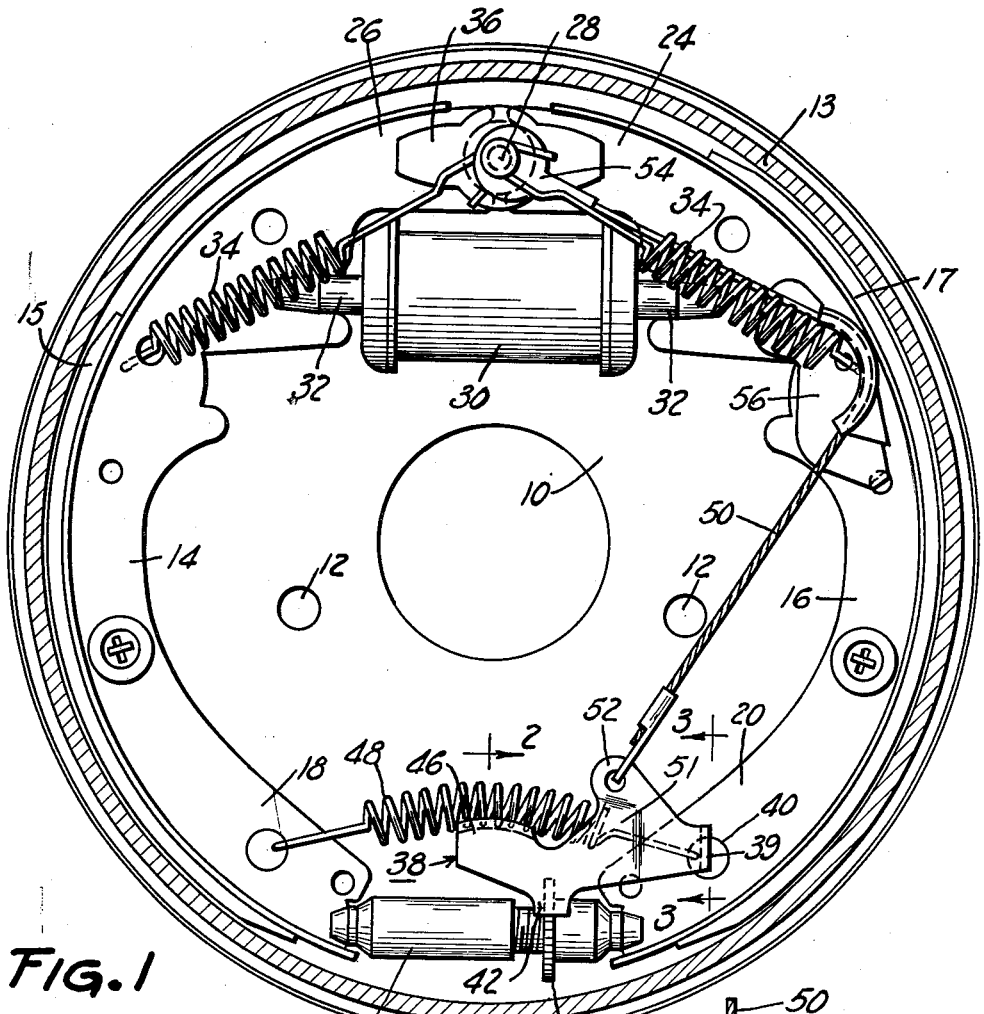
FIGURE 1 is a front elevational view of one embodiment of the invention.
FIGURE 2 is a view along section line 2—2 of FIGURE 1.
FIGURE 3 is a view taken along section line 3—3 of FIGURE 1.

With reference to FIGURE 1, the brake comprises a backing plate 10, having holes 12 receiving bolts to mount the backing plate on an appropriate part of a vehicle such as, for example, an axle flange, not shown. Brake shoes 14, 16 are slidably mounted on the backing plate 10 and have their ends 18, 20 interconnected by adjusting strut 22. The opposite ends 24, 26 of the brake shoes engage anchor pin 28, which mounted on the backing plate 10 when the brake shoes are in a retracted position. The fluid motor 30 has links 32 engaging the ends 24, 26 of the brake shoes and spreads the ends 24, 26 apart upon actuation of the fluid motor 30. Springs 34 have one end connected to the anchor pin 28 and the other end connected to its respective brake shoe and serve to return the brake shoes to retracted position and thereby restoring the shoe ends 24, 26 into engagement with anchor pin 28. The shoe guide plate 36 is mounted on the anchor pin 28 and serves to prevent excess movement of the shoe ends 24, 26 away from the backing plate 10. Lever 38 has a projection 39 extending into opening 40 effecting a pivotal connection to the web of brake shoe 14.

The lever 38 also has a tip 42 engaging a serrated wheel 44 of the adjusting strut 22 and a dependent portion 46 extending in the direction of the backing plate which wraps partially around and engages the intermediate portion of the spring 48. Spring 48 is attached to the ends 18, 20 of the brake shoe and serves to hold the ends 18, 20 in engagement with the adjusting strut 22 and also serves to bias the lever 38 into engagement with the serrated wheel 44. In other words, it biases the lever 38 to pivot counterclockwise about opening 40. Cable 50 is attached to portion 52 of the lever 38 and is connected to the anchor pin 28 through the eyelet 54 secured to the cable 50. The portion 52 is below the plane of the cable whereby the cable will produce a force component slightly away from the backing plate on the lever 38. The portion 51 adjacent to portion 52 is bent above the spring 48 as shown in FIGURE 3. The guide 56 is mounted on the brake shoe 16 and slidably receives the cable 50. During spreading movement of the shoes, tip 42 will be slightly tilted toward the backing plate, due to the fulcruming of lever 38 on spring 48 and opening 44, to allow the tip to drop to the next tooth of wheel 44 if the distance of travel required for the friction pads to engage the brake drum 13 is more than desired. The spring 48 will effect a force on lever 38 which is in a direction away from the center of the backing plate and slightly in a direction away from the backing plate thereby producing a rotational force on the serrated wheel 44 during retraction of the shoes.

The brake, as illustrated, is adapted to be automatically adjusted only upon rearward movement and braking of the vehicle. Assuming that the brake drum 13 rotates in a clockwise direction during rearward movement, upon actuation of the fluid motor 30, brake shoes 14, 16 will spread until friction pads 15, 17 engage the surface of the brake drum. Brake shoe 16 is the primary shoe and will move in a clockwise direction until the secondary shoe 14 anchors against the anchor pin 28. Simultaneously, the cable 50 will be tensioned thereby pivoting lever 38 about opening 40 and depending upon the distance of travel required for the friction pads to engage the brake drum 13 the tip 42 of the lever 38 will either remain in engagement with the same serrated tooth or drop to the next tooth if the distance of travel is more than desired. Upon return movement of the brake shoes 14, 16 to retracted position, the tension on cable 50 is released and spring 48 produces a rotational force on serrated wheel 44 through lever 38 thereby rotating the serrated wheel 44 if the tip 42 has picked up another tooth of the wheel 44, or if it has not picked up another tooth, the spring 48 merely returns the lever 38 to unactuated position without rotating the serrated wheel 44.

Figure 4:
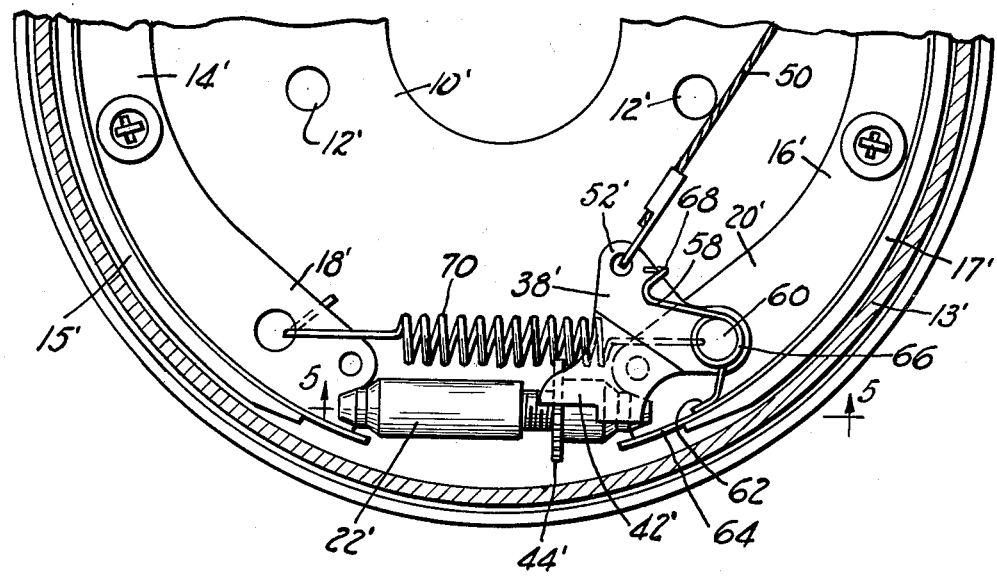
FIGURE 4 is a modification of FIGURE 1.
Figure 5:
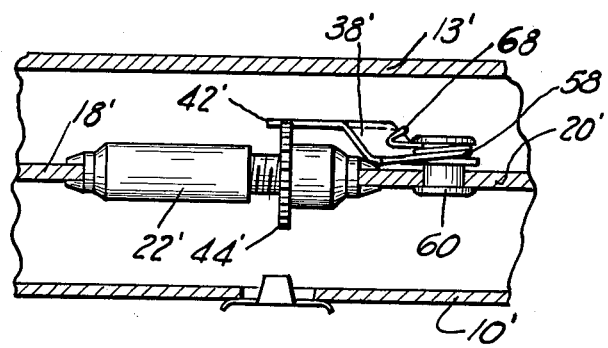
FIGURE 5 is a view taken along section line 5—5 of FIGURE 4.

Referring to FIGURE 4, those portions of FIGURE 3 which correspond to similar portions shown in FIGURE 1 will be designated by like reference numerals and will be characterized further in that a prime mark will be affixed thereto. FIGURE 4 illustrates a modification of the adjusting mechanism wherein torsion spring 58 biases the tip 42' of lever 38' into engagement with the serrated wheel 44'. The lever 38' is pivotally connected to a pin 60 which is mounted on the web of shoe 16'. The torsion spring 58 has one end 62 engaging the rim 64 of the brake shoe 16, has an intermediate portion 66 wrapped around the pin 60 and has its other end portion 68 engaging the lever 38'. Spring 70 holds the brake shoe ends in contact with the adjusting strut 22'. During spreading movement of the shoes, tip 42 will be slightly tilted toward the backing plate to allow the tip to drop to the next tooth of wheel 44' if the distance of travel required for the friction pads to engage the brake drum 13 is more than desired. The torsion spring 58 will effect a force on lever 38' which is in a direction away from the center of the backing plate and slightly in a direction away from the backing plate thereby producing a rotational force on the serrated wheel 44' during retraction of the shoes. The automatic adjuster operates in the same manner as the previous embodiment. Upon movement of the vehicle in rearward direction, cable 50' pivots lever 38' about pin 60 thereby tensioning spring 58 which effects a rotational force upon the serrated wheel 44' through lever 38' and the tip 42' thereby rotating serrated wheel 44' if the brake shoes travel more than the required distance upon actuation thereof.

While the adjusting mechanism has been shown to be actuated by reverse movement and braking of the vehicle, obviously, the adjusting mechanism may be actuated upon forward movement and braking of the vehicle. Furthermore, though the cables 50 and 50' have been illustrated as being attached to the same brake shoe web that the levers 38 and 38' are pivotally mounted on, the cables 50 and 50' may be attached to the web of the other brake shoe 14 or 14'.

Although this invention has been illustrated in connection with specific embodiments, numerous other adaptations of the invention will be apparent to those skilled in the art. I intend to include within the scope of the following claims all equivalent applications of the invention whereby the same or substantially the same results may be obtained.

I claim:

1. In a brake assembly, a backing plate, brake shoes arranged in end to end relationship on said backing plate, an adjusting strut between two opposed ends of the brake shoes and operatively connected to said brake shoes for adjustment thereof, said adjusting strut including an element for expanding or contracting said strut, a lever pivotally supported by one end of said brake shoes and having a portion in engagement with said element for actuating said element, spring means connected to each of said opposed ends in engagement with said adjusting strut, said spring means having a portion intermediate the ends thereof engaging a portion of said lever, said spring means and lever being so arranged to provide a sole force for biasing said lever portion into engagement with said element, means attached to said lever for pivoting said lever against the force of said spring means upon actuation of said shoes, said spring means actuating said element through said lever portion upon return of said shoes to unactuated position when said brake shoes spread a certain distance upon actuation thereby adjusting said brake shoes.

2. The structure as recited in claim 1 wherein said lever has a portion extending in a direction transverse to the backing plate on which said intermediate portion of spring means engages.

References Cited in the file of this patent

UNITED STATES PATENTS

| | | |
|---|---|---|
| 2,060,429 | Smith | Nov. 10, 1936 |
| 2,762,463 | Brooks | Sept. 11, 1956 |
| 2,978,072 | Burnett | Apr. 4, 1961 |